United States Patent [19]

Kobayashi et al.

[11] Patent Number: 5,741,982
[45] Date of Patent: *Apr. 21, 1998

[54] METHOD FOR MANUFACTURING A MAGNETOSTRICTIVE SHAFT

[75] Inventors: Nobuaki Kobayashi; Satoshi Kaise; Hideki Kano, all of Atsugi, Japan

[73] Assignee: Unisia JECS Corporation, Atsugi, Japan

[*] Notice: The term of this patent shall not extend beyond the expiration date of Pat. No. 5,562,004.

[21] Appl. No.: 696,095

[22] Filed: Aug. 13, 1996

Related U.S. Application Data

[62] Division of Ser. No. 345,751, Nov. 22, 1994, Pat. No. 5,589,645.

[30] Foreign Application Priority Data

Nov. 30, 1993 [JP] Japan ................................. 5-326325
Dec. 3, 1993 [JP] Japan ................................. 5-339290

[51] Int. Cl.[6] .......................................................... G01L 3/00
[52] U.S. Cl. .................. 73/862.336; 148/122; 324/209; 73/862.333
[58] Field of Search ......................... 148/120, 121, 148/122; 324/209; 73/862.333, 862.334, 862.335, 862.336, 650, 659, 660

[56] References Cited

U.S. PATENT DOCUMENTS

| | | | |
|---|---|---|---|
| 4,727,757 | 3/1988 | Hilzinger et al. | 73/862.36 |
| 4,823,620 | 4/1989 | Edo et al. | 73/862.36 |
| 4,840,073 | 6/1989 | Aoki et al. | 73/862.36 |
| 4,896,544 | 1/1990 | Garshelis | 73/862.36 |
| 5,107,711 | 4/1992 | Aoki et al. | 73/862.36 |
| 5,321,985 | 6/1994 | Kashiwagi et al. | 73/862.335 |
| 5,323,659 | 6/1994 | Wakamiya et al. | 73/862.28 |
| 5,419,206 | 5/1995 | Kamioka et al. | 73/862.333 |
| 5,419,207 | 5/1995 | Kobayashi et al. | 73/862.333 |
| 5,442,966 | 8/1995 | Hase et al. | 73/862.333 |
| 5,458,102 | 10/1995 | Tomisaua et al. | 123/435 |
| 5,491,369 | 2/1996 | Ishino et al. | 310/26 |
| 5,562,004 | 10/1996 | Kaise et al. | 73/862.336 |
| 5,585,574 | 12/1996 | Sugihara et al. | 73/862.334 |

*Primary Examiner*—Hezron E. Williams
*Assistant Examiner*—Rose M. Miller
*Attorney, Agent, or Firm*—Foley & Lardner

[57] ABSTRACT

A structure of a magnetostrictive shaft applicable to a magnetostriction-type torque sensor and a method for manufacturing the same can achieve a high torque sensitivity. A shaft parent material is made of a non-magnetic austenitic series metallic material (YHD50) and a magnetic thin film is made of a magnetostriction material such as Iron-Aluminium series alloy plasma spray coated on the whole outer peripheral surface of the shaft parent material. In a second embodiment, a mechanical working is carried out for the shaft material on the surface of which the magnetostriction material thin film is coated, the worked shaft material is heated under an inert gas atmosphere, and the heated shaft material is immersed into oil under the inert gas atmosphere to perform the oil quenching.

5 Claims, 8 Drawing Sheets

METHOD FOR MANUFACTURING A MAGNETOSTRICTIVE SHAFT

This application is a division of application Ser. No. 08/345,751, filed Nov. 22, 1994, U.S. Pat. No. 5,589,645.

BACKGROUND OF THE INVENTION

1. Field of the Invention

The present invention relates to a structure of a magnetostrictive shaft applicable to a magnetostriction type torque sensor which is so constructed as to detect a torque applied to a rotatable shaft and output a signal according to a magnitude and direction of the applied torque and a method for manufacturing the same.

2. Description of the Background Art

U.S. patent applications Ser. No. 07/969,056 filed on Oct. 30, 1992 and now U.S. Pat. No. 5,419,206, Ser. No. 08/068,668 filed on May 28, 1993 and now U.S. Pat. No. 5,419,202, and Ser. No. 08/222,809 filed on Apr. 5, 1994 and now U.S. Pat. No. 5,458,102 exemplify a previously proposed structure of a magnetostriction type torque sensor, the sensor inserted in an electric bridge circuit to output a signal according to a magnitude and direction of the torque applied to a magnetostrictive shaft interposed between intermediate ends of a torque applied rotatable shaft.

SUMMARY OF THE INVENTION

It is an object of the present invention to provide a structure of a magnetostrictive shaft applicable to a magnetostriction-type torque sensor and a method for manufacturing the same which can achieve a high torque detection sensitivity.

The above-described object can be achieved by providing a structure of a magnetostriction-type torque sensor, comprising: a) a cylindrical outer casing: b) a magnetostrictive shaft disposed within said outer casing so as to enable a rotation thereof according to a torque applied thereto; and c) a pair of self-inductance determining coils, each coil being connected to a torque magnitude and direction detection circuitry and being wound around a radial part of an outer peripheral surface of the magnetostrictive shaft with a gap provided against the outer peripheral surface, wherein said magnetostrictive shaft comprises a shaft parent material made of a non-magnetic austenitic series metallic material and a magnetic thin film formed on the whole outer peripheral surface of said magnetostrictive shaft parent material, said magnetic thin film being made of a magnetostriction material.

The above-described object can also be achieved by providing a method for manufacturing a magnetostrictive shaft of a magnetostriction-type torque sensor, said magnetostrictive shaft being interposed between intermediate ends of a rotatable shaft and having an outer peripheral surface being made of a magnetostriction material, comprising the steps of: a) mechanical working a shaft material of the magnetostrictive shaft; b) heating said mechanically worked shaft material under an inert gas atmosphere and holding said mechanically worked shaft material at a heated temperature; and c) immersing the heated shaft material into an oil filled bath under the inert gas atmosphere so as to increase a cooling rate of the heated shaft material.

BEST MODE FOR CARRYING OUT THE INVENTION

Reference will hereinafter be made to the drawings in order to facilitate a better understanding of the present invention.

(First Embodiment)

Before explaining a first preferred embodiment of a structure of a magnetostrictive shaft applicable to a magnetostriction type torque sensor according to the present invention, the structure of a previously proposed torque sensor will be described below to which the present invention is applicable.

Figure 1:
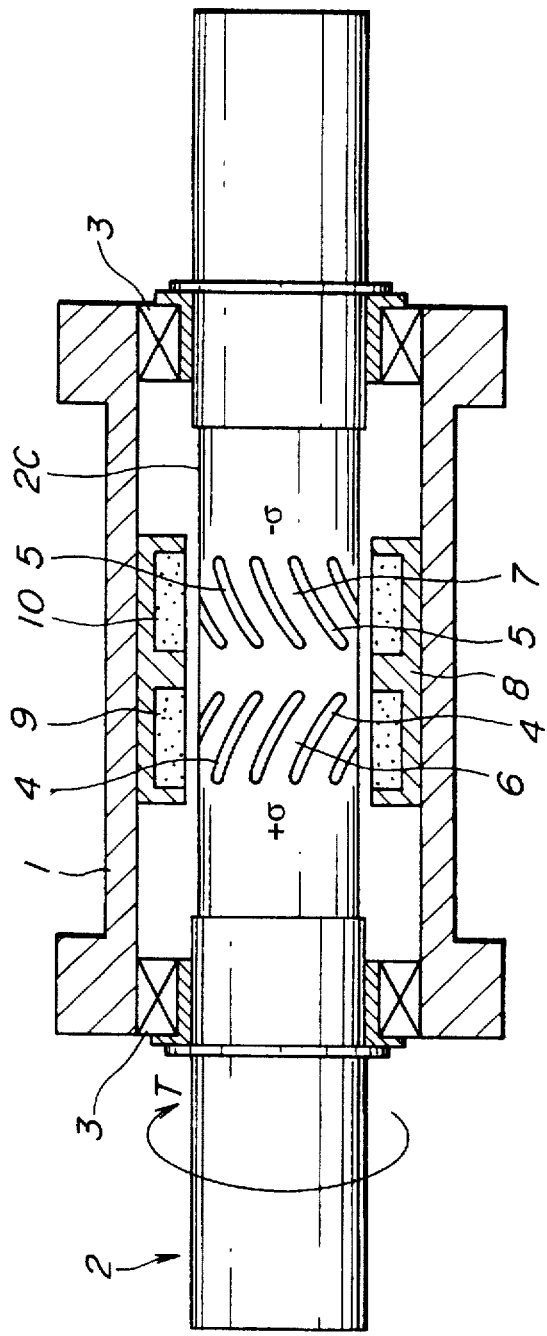
FIG. 1 is a partially cross sectioned view of a magnetostriction-type torque sensor to which a first embodiment of a magnetostrictive shaft according to the present invention is applicable.

FIG. 1 shows an example of the torque sensor to which the first embodiment of the magnetostrictive shaft is applicable.

It is noted that the structure of the torque sensor is exemplified by a U.S. patent application Ser. No. 07/969,056 filed on Oct. 30, 1992 and now U.S. Pat. No. 5,419,206 the disclosure of which is herein incorporated by reference.

In FIG. 1, a cylindrical outer casing 1 is formed around a magnetostrictive shaft 2 and is made of a non-magnetic material. The cylindrical outer casing 1 is fixed on a casing of an automatic power transmission unit of an automotive vehicle (not shown). The magnetostrictive shaft 2 is rotatably disposed within the outer casing 1 via ball bearings 3 and 3.

The magnetostrictive shaft 2 generally includes: a shaft parent (also called mother) material 2A formed in a bar shape of a structural steel such as Carbon Steel (SC), Nickel-Chromium Steel (SNC), Nickel-Chromium-Molybdenum Steel (SNCM), Chromium Steel (SCr), Chromium-Molybdenum Steel (SCM), Manganese Steel (SMn), or Manganese-Chromium Steel (SMn C); and a magnetic thin film 2B formed over a whole outer peripheral surface of the magnetostrictive parent material 2A of a magnetostrictive material such as an Iron-Aluminium series alloy. Both ends of the magnetostrictive shaft 2 are projected toward the outside of the outer casing 1 so as to form an output shaft. A slit forming portion 2C is located on an axial intermediate portion of the magnetostrictive shaft 2 and formed on the magnetic thin film 2B. One group 4 of slit grooves are inscribed on a part of the outer peripheral surface of the slit forming portion 2C at each groove tilt angle of 45 degrees downward to the center peripheral surface. The other group 5 of slit grooves are inscribed on a part of the outer peripheral surface of the slit forming portion 2C at each groove tilt angle of 45 degrees upward from the center peripheral surface, as shown in FIG. 1.

Each slit groove 4 and 5 is spaced apart from each other with a predetermined interval of distance and is formed individually on the whole radial outer peripheral surface with an equal interval of distance with respect to the adjacent grooves. Each slit groove of the one group 4 is formed with a first magnetic anisotropy portion 6 and each slit groove of the other group 5 is formed with a second magnetic anisotropy portion 7. Each magnetic anisotropy portion 6 and 7 forms a magnetic path as denoted by broken lines of FIG. 2 due to a surface magnetic field.

Referring back to FIG. 1, a core member 8 encloses the slit forming portion 2C from a radial outside of the magnetostrictive shaft 2 and is formed in a stepped cylindrical shape of a magnetic material such as an iron. Detection/excitation coils 9 and 10 are disposed in an inner peripheral side of the core member 8.

The detection/excitation coils 9 and 10 are faced radially against the magnetic anisotropy portions 6 and 7. The detection/excitation coils 9 and 10 are disposed in the inner side of the core member 8 via corresponding coil bobbins (not shown). The coils 9 and 10 serve to energize the coils and detect the torque applied to the shaft 2 when an alternating voltage V is applied thereacross from an oscillator 13 as will be described later.

Figure 4:
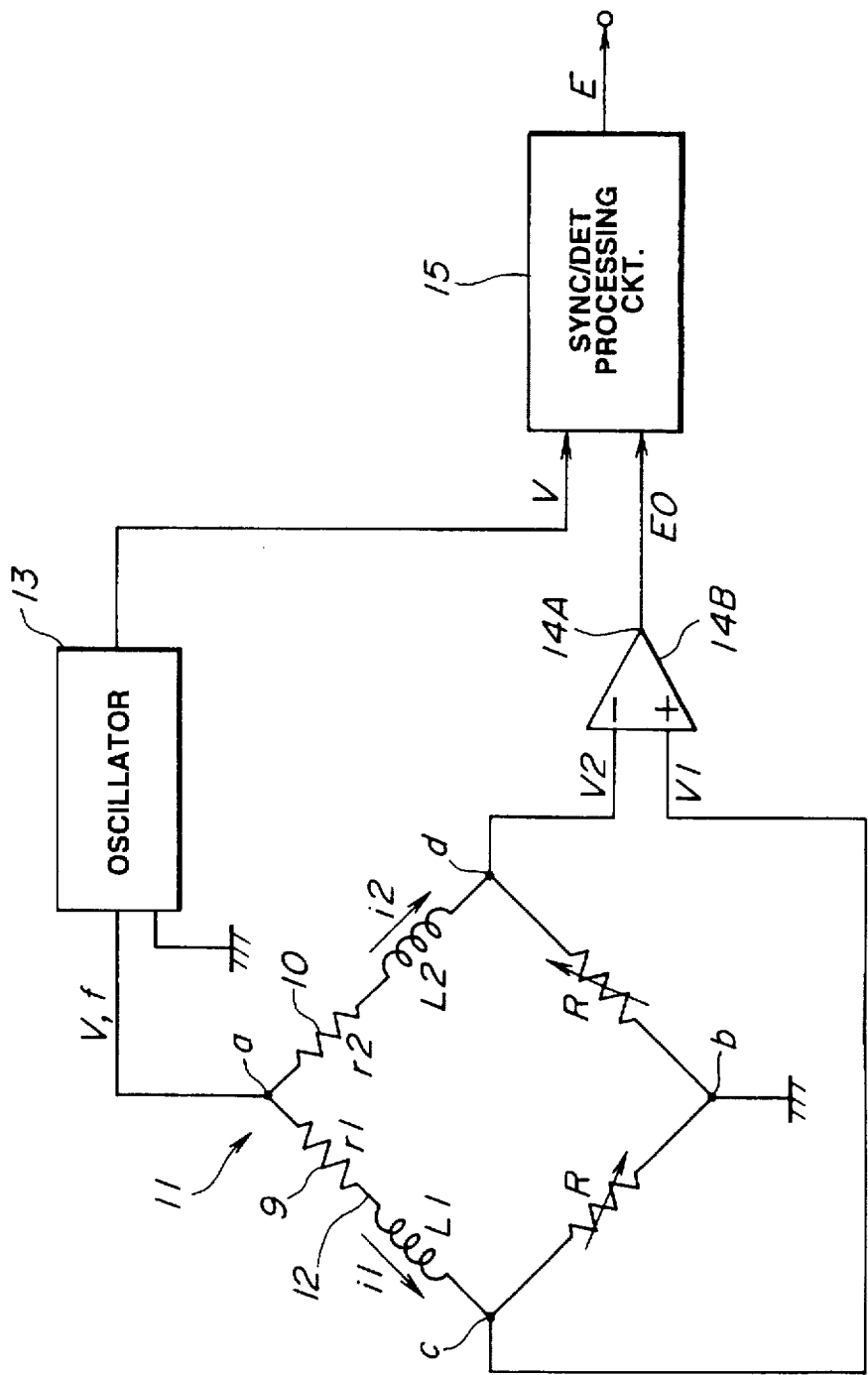
FIG. 4 is an example of an electric detection circuitry for detecting a torque applied to a rotatable shaft connected to the magnetostrictive shaft and outputting a voltage signal E according to the torque applied thereto.

As shown in FIG. 4, the detection/excitation coils 9 and 10 have their self-inductances L1 and L2 and their iron losses and direct current resistances are denoted by r1 and r2, respectively.

FIG. 4 shows a previously proposed detection circuitry applicable to the torque sensor in the first preferred embodiment.

In addition, the torque detection circuitry to which the coils 9 and 10 are connected is exemplified by a U.S. patent application Ser. No. 08/068,668 filed on May 28, 1993, the disclosure of which is herein incorporated by reference.

As shown in FIG. 4, the detection circuitry 11 includes: a bridge circuit 12; the oscillator 13; a differential amplifier 14; and a synchronization/waveform detection processing circuit 15. The bridge circuit 12 shown in FIG. 4 has four arms, the first arm having one detection/excitation coil constituted by the self-inductance L1 and direct current resistance r1 (iron loss inclusive), the second arm having the other detection/excitation coil constituted by the self-inductance L2 and direct current resistance r2 (iron loss inclusive), the third arm having one variable resistor R, and the fourth arm having the other variable resistor R. A junction denoted by a of FIG. 4 is connected to the oscillator 13 and a junction denoted by b is grounded. The oscillator 13 outputs the alternating voltage V having a frequency of f. A junction c and a junction d are connected to a plus input end of the differential amplifier 14 and to a minus input end thereof, respectively. It is noted that an output end of the oscillator 13 is connected to the synchronization/waveform detection processing circuit 15 and an output end 14A of the differential amplifier 14 is connected to the above-described synchronization/waveform detection processing circuit 15. The synchronization/waveform detection processing circuit 15 synchronizes the output voltage E0 from the differential amplifier 14 with the alternating voltage V and rectifies the output voltage E0 to output a direct-current output voltage E.

Figure 3:
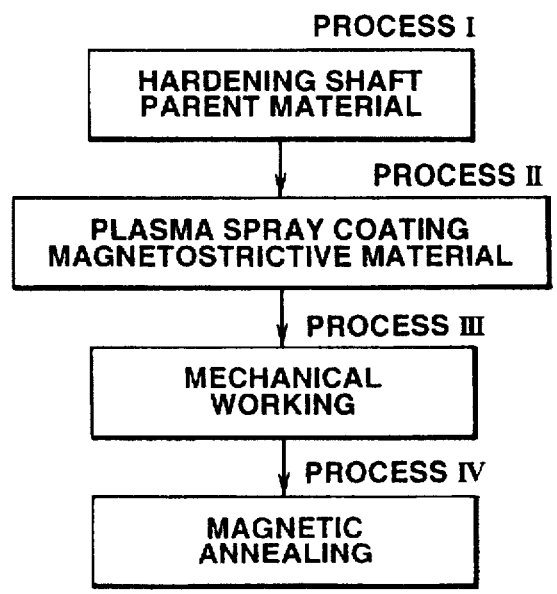
FIG. 3 is a simplified series of processes of manufacturing the previously proposed magnetostrictive shaft.

FIG. 3 shows a simplified flowchart of a previously proposed manufacturing method of the magnetostrictive shaft 2 shown in FIG. 1.

At the process I of FIG. 3, the shaft parent material 2A constituted by the structural steel is heated up to a temperature, for example, ranging from 750° C. to 900° C. to undergo a hardening so as to provide the shaft parent material 2A for a desired hardness.

At the next process II of FIG. 3, a spray coating of the magnetostriction material such as the iron-aluminium series alloy is treated on the whole peripheral surface of the shaft parent material 2A so as to form integrally the magnetic thin film 2B with the shaft parent material 2A.

At the next process III of FIG. 3, a surface treatment is carried out on the magnetic thin film 2B over the whole outer peripheral surface of the shaft parent material 2A and a mechanical working of each slit groove 4 and 5 is carried out to form the magnetic anisotropy portions 6 and 7 on the surface of the magnetic thin film 2B.

At the next process IV of FIG. 3, a magnetic annealing is carried out by heating the whole magnetostrictive shaft 2 formed with the slit grooves 4 and 5 up to about 850° C. so that a working distortion (strain) is eliminated from the magnetostrictive shaft 2, the degree of hysterisis is reduced, and output sensitivities and hysterisis deviations of the individual magnetostrictive shafts 2 are reduced.

Next, the operation of the torque sensor shown in FIG. 1 and detection circuit shown in FIG. 4 will be described.

When the alternating voltage V from the oscillator 13 is applied to the excitation/detection coils 9 and 10, the magnetic paths due to the surface magnetic fields are formed along the magnetic anisotropy portions 6 and 7 between the respective slit grooves 4 and 5 of the slit forming portion 2C. In this case, the variable resistors R are adjusted to provide zero output voltage E0 of the differential amplifier 14 with the torque applied to the magnetostrictive shaft 2 given as zero.

When, in this state, a torque T denoted by an arrow marked direction of FIG. 1 is acted upon the shaft 2, a tensile stress +σ is acted along the one magnetic anisotropy portion 6 between each slit groove 4 and a compressive stress −σ is acted along the other magnetic anisotropy portion 7 between each slit groove 5. If a positive magnetostriction material is used for the magnetostrictive shaft 2, the magnetic anisotropy portion 6 increases its permeability µ due to the tensile stress +σ and, on the contrary, the magnetic anisotropy portion 7 decreases its permeability µ due to the compressive stress −σ.

Here, since the detection/excitation coil 9 disposed so as to face against the magnetic anisotropy portion 6 of the shaft 2 has the self-inductance L1 which is increased due to the increase in the permeability μ, the current flowing through the coil 9 is decreased. On the other hand, since the self-inductance L2 of the coil 10 is decreased due to the decrease in the permeability μ, the current flowing through the coil 10 is increased. Consequently, the detected voltage V1 from the coil 9 is decreased and the detected voltage V2 from the coil 10 is, in turn, increased, the differential amplifier 14 carries out the amplification of the difference between V1 and V2 as follows:

$$E0 = A \times (V1-V2) \quad (1),$$

wherein A denotes an amplification factor.

The alternating output voltage E0 from the output end of the differential amplifier 14A is transmitted to the synchronization/waveform detection processing circuit 15. The synchronization/waveform detection processing circuit rectifies and processes the output voltage E0 so that the direct-current output voltage E, as shown in FIG. 5, is output as the detection signal corresponding to the magnitude and direction of the torque applied to the shaft 2.

Figure 5:
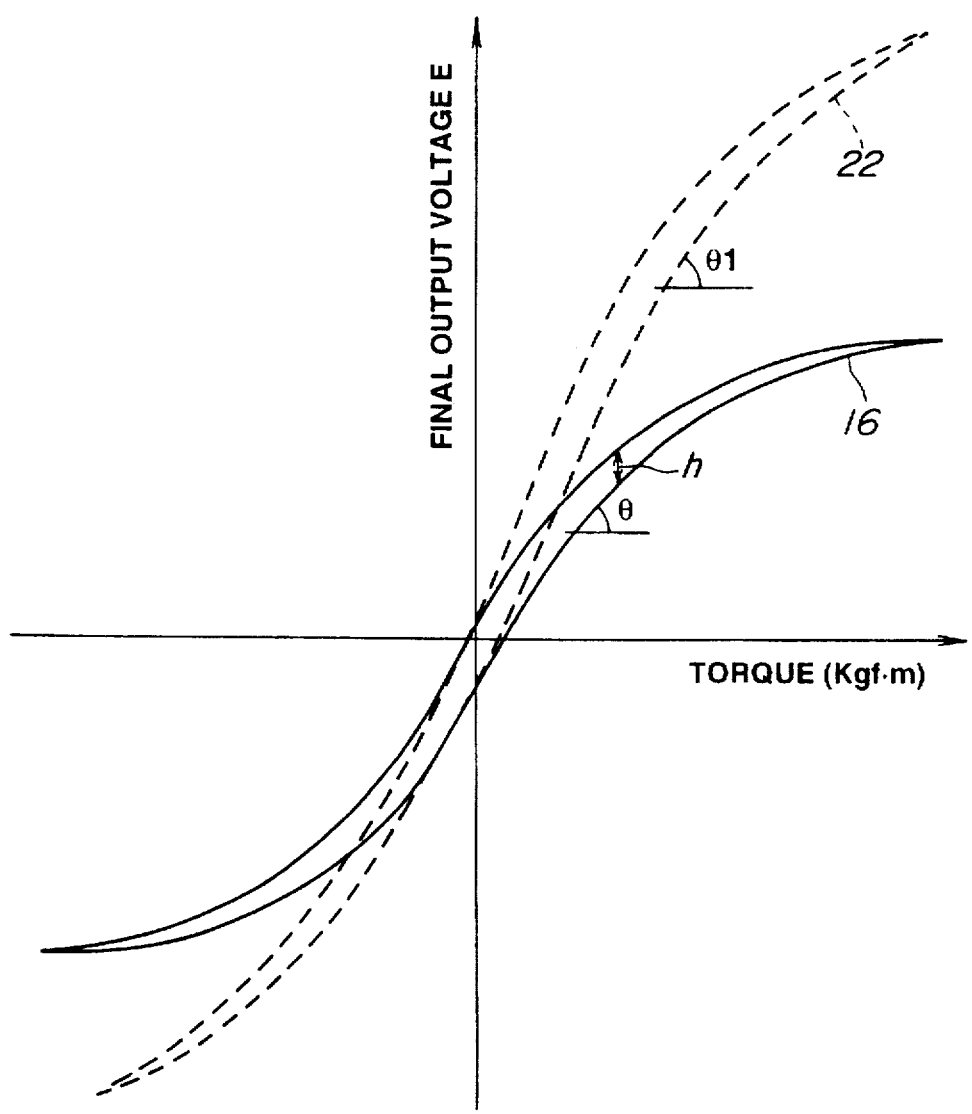
FIG. 5 are characteristic graphs of hysterisis loops of the previously proposed magnetostrictive shaft and of a magnetostrictive shaft in the first embodiment according to the present invention.

A relationship between the torque acted upon the shaft 2 and output voltage E is represented by a characteristic curve 16 of FIG. 5. The torque sensitivity is represented by a gradient θ and the hysterisis of the shaft when the torque is varied is represented as a hysterisis width h of the curve 16 in FIG. 5.

Figure 2:
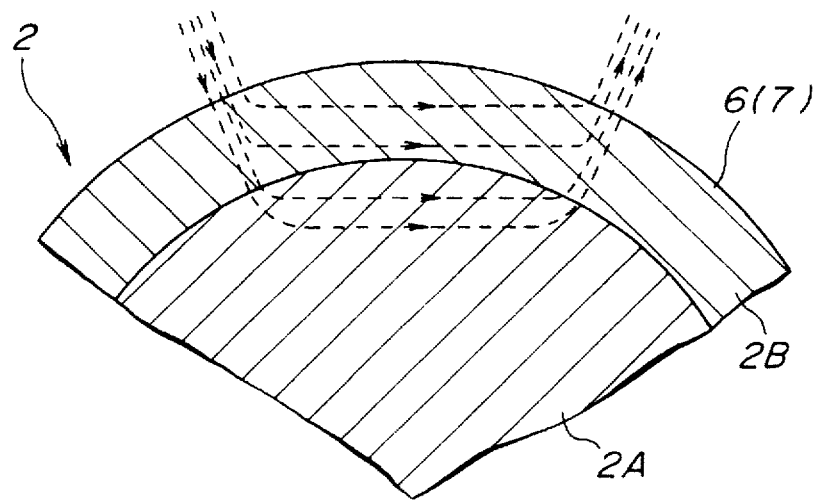
FIG. 2 is a partially enlarged and cross sectioned view of the magnetostrictive shaft of a previously proposed torque sensor for explaining directions of magnetic fluxes in the case of a previously proposed magnetostrictive shaft shown in FIG. 1.

In the previously proposed magnetostrictive shaft 2, the magnetic paths from the coils 9 and 10 are invaded into the internal of the shaft parent material 2A, as denoted by the broken lines of FIG. 2, so that an internal magnetic flux of the magnetic thin film becomes low due to the use of the structural steel of the parent material of the shaft 2A.

However, in the first embodiment, the magnetic paths are concentrated into the internal of the magnetic thin film 2B of the magnetostrictive shaft 2 so that the magnetic flux can be high and the torque detection sensitivity can be improved.

In the first embodiment, the shaft parent material of the magnetostrictive shaft is formed of a non-magnetic austenitic series metallic material so that the magnetic fluxes from the detection/excitation coils are not invaded into the shaft parent material and the magnetic flux density of the magnetic thin film can be positively higher.

Figure 6:
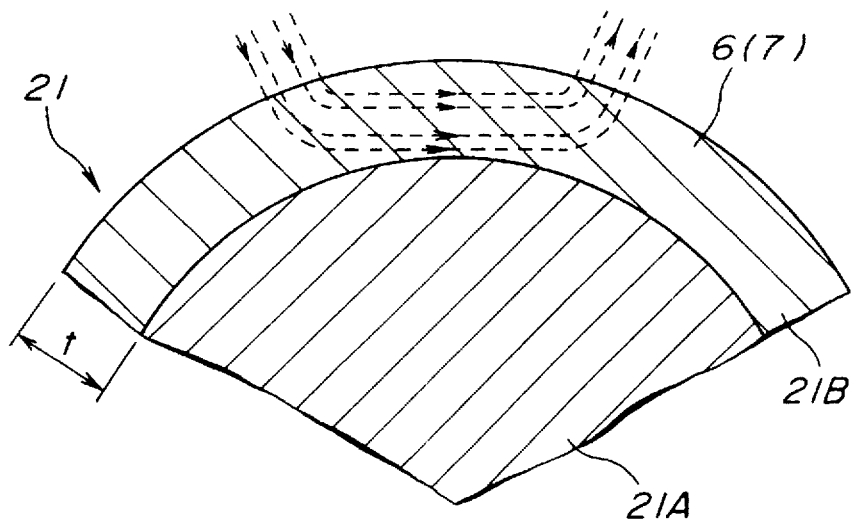
FIG. 6 is a partially enlarged and cross sectioned view of the magnetostrictive shaft in the case of the first embodiment.
Figure 7:
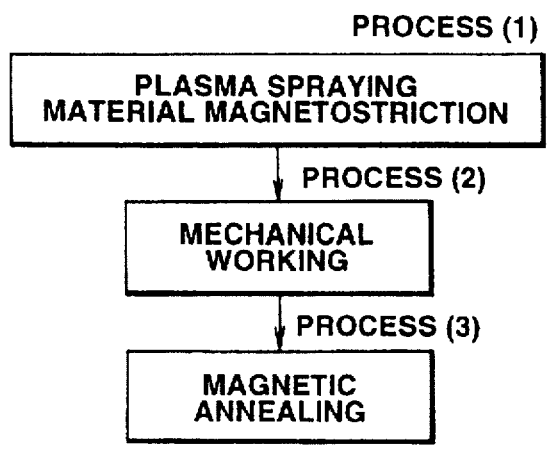
FIG. 7 is a simplified series of processes to manufacture and achieve the magnetostrictive shaft in the first embodiment.

FIG. 6 and FIG. 7 show the first preferred embodiment of the structure of the magnetostrictive shaft 21 according to the present invention.

In FIG. 6, the magnetostrictive shaft 21 used in the first embodiment includes the shaft parent material 21A and magnetic thin film 21B in the same way as described above.

However, in the first embodiment, the parent material of the shaft 21A is formed of a non-magnetic austenitic series metallic material such as a hot working die steel (YHD50).

Here, the manufacturing method of the magnetostrictive shaft 21 will be explained with reference to FIG. 7.

At a process of (1) in FIG. 7, the shaft parent material 21A made of YHD50 is previously prepared.

Then, a plasma spray coating with a powder of a magnetostriction material such as an iron-aluminium series alloy is carried out for the whole peripheral surface of the shaft parent material 21A so as to form the thin magnetic film 21B over the whole periphery of the parent shaft material 21A. In this case, since the shaft parent material 21A constituted by YHD50 is substantially hardened under a heating process of (3) as will be described below, the hardening process of process I shown in FIG. 3 can be omitted.

A thickness of the magnetic thin film 21B approximately corresponds to a skin depth S expressed as follows:

$S=\sqrt{(2\rho/W\mu)}$, wherein ρ denotes an electrical resistance of the magnetic thin film, W denotes an external magnetic field angular velocity, and μ denotes its permeability. For example, the thickness t is set to a range from 0.1 mm to 0.3 mm.

Next, at a process (2) of FIG. 7, a surface working on the magnetic thin film 21B is carried out and a mechanical working to form the slit grooves (denoted by 4 and 5 in FIG. 1) of the respective magnetic anisotropy portions is carried out on the surface of the magnetic thin film 21B.

Next, at a process (3) of FIG. 7, the magnetostrictive shaft 21 is heated up to a temperature range from 700° C. to 1100° C. and its heated state is held for a period of time equal to or more than one hour. Thereafter, a magnetic annealing is carried out by quenching (cooling) the heated parent material 21A into an oil (oil-filled bath) so that a working strain (worked distortion) is eliminated, the hysterisis width is reduced, and deviations in the hysterisis loops and output sensitivities for the individual magnetostrictive shaft products are reduced. At this time, the shaft parent material 21A is substantially hardened to increase the hardness thereof.

The magnetostrictive shaft 21 is made as described above, i.e., the shaft parent material 21A being formed of the non-magnetic austenitic series metallic material such as YHD50 and the plasma spray coating with the magnetostriction material such as the iron-aluminium series alloy is carried out to form the magnetic thin film 21B.

Therefore, as shown in FIG. 6, the magnetic fluxes from the coils are not invaded into the inside of the parent material 21A of the shaft 21 so that the magnetic fluxes are concentrated into the magnetic thin film 21B of the shaft 21 and the magnetic flux density can be high. Consequently, the torque detection sensitivity of the magnetostriction type torque sensor can be improved. Thus, the gradient $\theta_1$ of the characteristic curve 22 denoted by a broken line of FIG. 5 can be enlarged.

In addition, since the shaft parent material 21A is formed of YHD50, the magnetic annealing for the magnetic thin film 21B and hardening for the shaft parent material 21A are simultaneously carried out at the process (3) of FIG. 7 under the same heating process. The manufacturing method of the magnetostrictive shaft 21 can be simplified and the manufacturing cost can be reduced.

The magnetostriction material to be used during plasma spray coating for the shaft parent material 21A is made of an alloy such as a permalloy.

(Second Embodiment)

Figure 8:
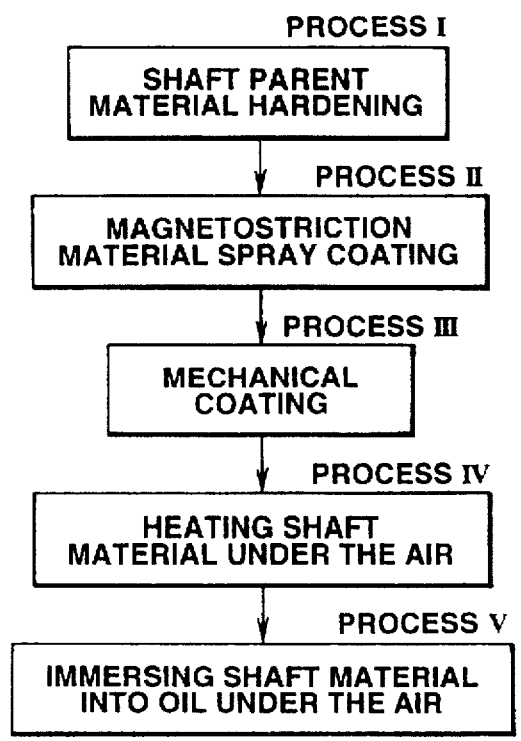
FIG. 8 is a simplified series of processes to manufacture and achieve the magnetostrictive shaft in a previously proposed method for manufacturing the same.

FIG. 8 shows a previously proposed manufacturing method of the magnetostrictive shaft 2.

At a process of (I) of FIG. 8, the shaft parent material 2A constituted by the structural steel is hardened to heat the parent material of the shaft 2 up to a temperature ranging from, for example, 750° C. to 900° C. to provide the shaft parent material 2A with the desired hardness.

At the next process of (II), the magnetostriction material such as the iron-aluminium series alloy is spray coated on the whole periphery surface of the shaft parent material 2A so that the magnetic thin film 2B is integrally formed on the parent material 2A of the shaft 2 to form integrally the shaft material 16.

At the next process of (III), the surface working is carried out for the magnetic thin film 2B enclosing the whole surface of the outer peripheral surface of the shaft parent material 2A and the mechanical working is carried out to form the slit grooves 4 and 5 on the surface of the magnetic thin film 2B so as to form the pair of magnetic anisotropy portions 6 and 7.

At the next process of (IV), the whole shaft 16 formed with the slit grooves 4 and 5 are heated up to, for example, 800° to 900° C., preferably, at about 850° C. under the air or nitrogen gas atmosphere and held at the heated temperature for about one hour.

Figure 9:
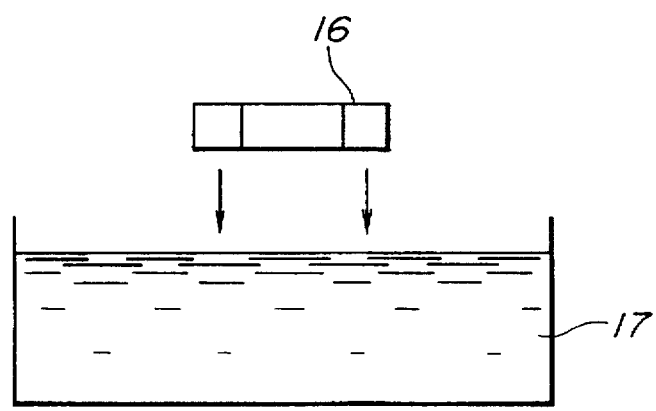
FIG. 9 is a process of immersing a parent material of the magnetostrictive shaft in an oil-filled bath in the case of the previously proposed manufacturing method explained with reference to FIG. 8.
Figure 10:
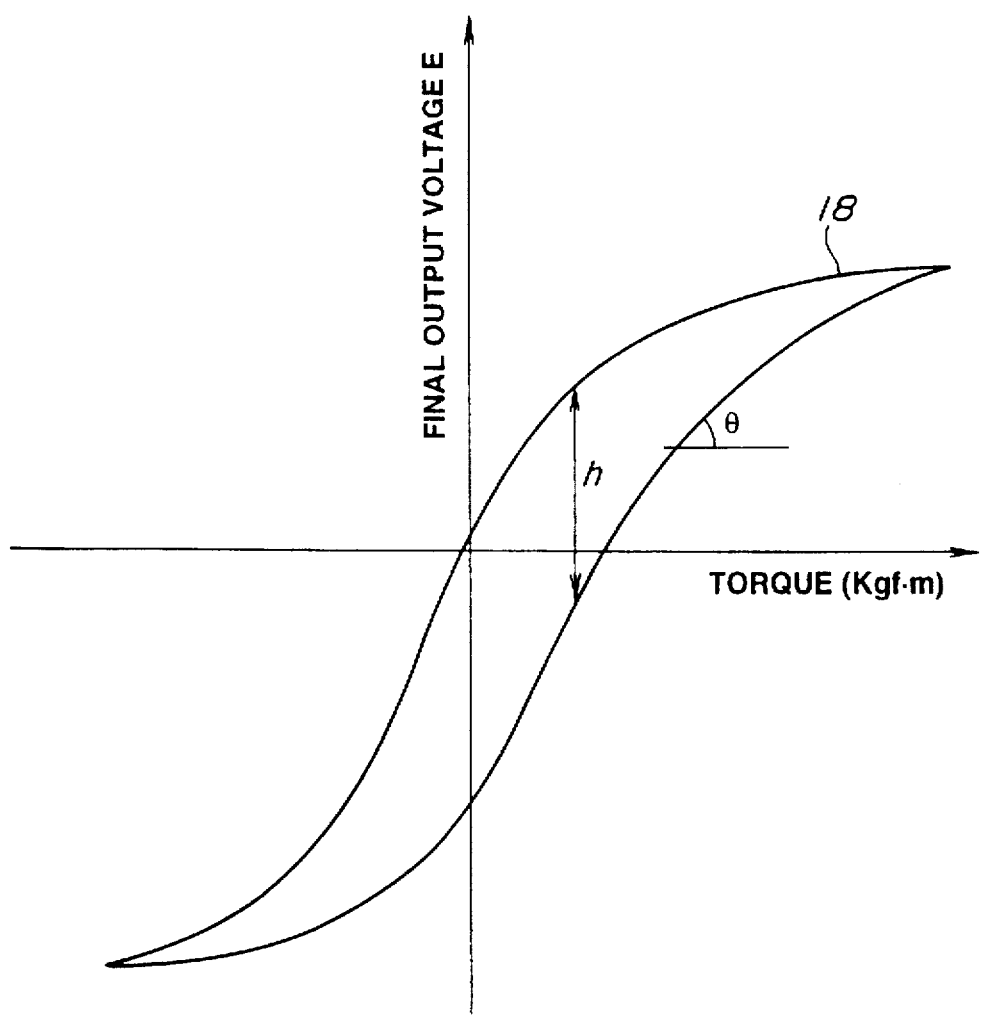
FIG. 10 is a characteristic graph of a torque-versus-output voltage in the case of the previously proposed manufacturing method of the magnetostrictive shaft shown in FIG. 9.

Next, at the process of (V), the whole shaft material 16 heated under the heating process (IV) is oil quenched by immersing the whole shaft material 16 into the oil bath 17 as shown in FIG. 9 under the air (atmospheric pressure) or nitrogen gas.

Thus, at both processes of (IV) and (V), the magnetic annealing is carried out for the shaft material 16 to produce the shaft material 16.

Figure 11:
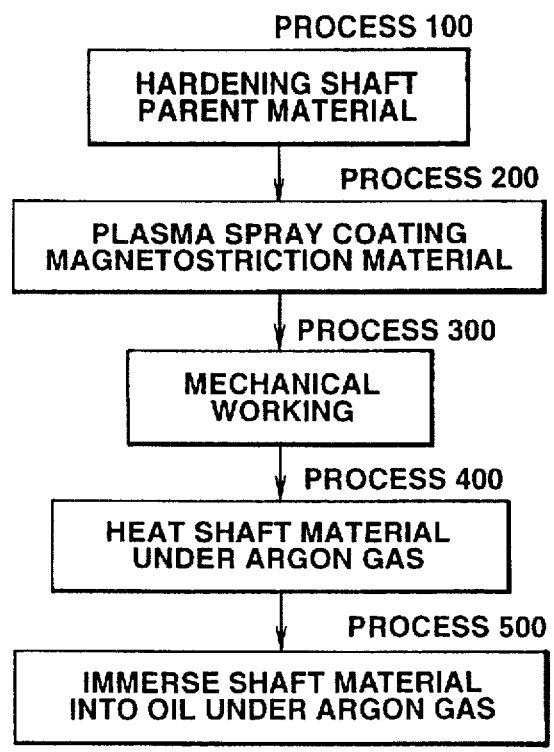
FIG. 11 is a simplified series of processes of a method for manufacturing the magnetostrictive shaft in a case of a second embodiment according to the present invention.
Figure 12:
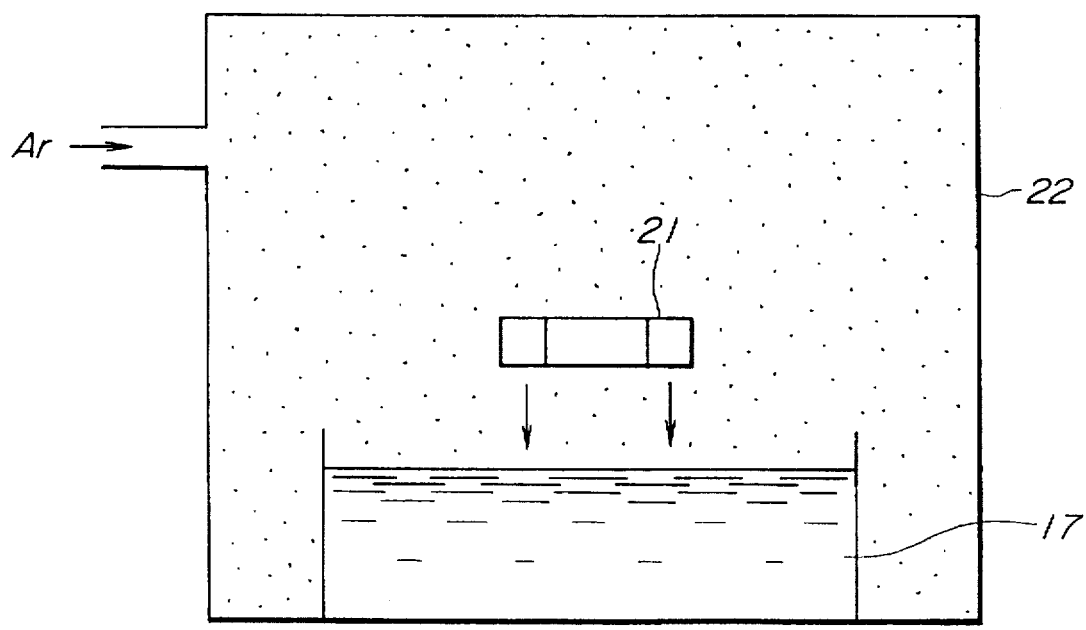
FIG. 12 is a schematic cross sectioned view of an oil bath under the inert gas (Argon) atmosphere for explaining an immersing process 500 in the case of the second embodiment shown in FIG. 11.

FIGS. 11 and 12 show a second embodiment of the method for manufacturing the magnetostrictive shaft 2.

First, at processes 100 through 300, the working process is shown. This working process is the same as that in the processes of (I) through (III) shown in FIG. 8. At the process of 100, the shaft parent material 2A constituted by the structural steel is heated up to, for example, 750° C. to 900° C. to perform the hardening.

At the process of 200, the magnetostriction material such as the iron-aluminium series alloy is spray coated over the whole periphery of the shaft parent material 2A to form integrally the magnetic thin film 2B with the shaft parent material 2A, thus forming the shaft material 21.

At the process of 300, the surface working is carried out for the magnetic thin film 2B enclosing the whole surface of the parent shaft material 2A and the mechanical working is carried out on the magnetic thin film 2B to form the slit grooves 4 and 5.

Next, at a process of 400 of FIG. 11, with an inert gas having 0.067 to 0.080 MPa (,i.e., 500 through 600 Torr) and constituted by an Argon (Ar) gas (or alternatively, Helium gas or Neon gas) filled in an air-sealed chamber 22 shown in FIG. 12, the shaft material 21 is heated by means of an electrical furnace (not shown) up to a temperature, for example ranging from 800° C. to 900° C., preferably, about 850° C. and held at the heated temperature for about one hour.

Next, at a process of 500, the whole heated shaft material 21 at the process of 400 is immersed into the oil 17 in the air-sealed chamber 22 with the Argon gas filled as shown in FIG. 12 so that the oil quenching is carried out for the shaft material 21 to achieve the magnetic annealing.

However, in the second embodiment, the heating of the shaft material 21 is performed for about one hour at about 850° C. with the Argon gas filled under the atmospheric pressure in the air-sealed chamber 22. In the oil quenching process, the whole shaft material 21 heated at the heating process is oil quenched into the oil 15 of the air-sealed chamber 22 filled with the Argon gas to perform the magnetic annealing.

Since the Argon gas is filled in the air-sealed chamber 22 with the shaft material 21 heated at the hearing process, the surface of the magnetic thin film 2B cannot be oxidized and nitrided when the shaft material 21 is held in the heated state. Hence, the hysterisis of the magnetostrictive shaft cannot be increased.

In addition, since the shaft material 21 is immersed into the oil 17 under the Argon gas atmosphere, the cooling velocity of the shaft material 21 can be fastened, or increased. Consequently, a large detection sensitivity to the magnetostrictive shaft 2 can be obtained.

Weight contents of Aluminium in the Iron-Aluminium series alloy constituting the magnetic thin film 2B are varied as 10 wt %, 13 wt %, and 15 wt %. At this time, the sensitivities and numerical values of the hysterisis were indicated as below.

It is noted that as reference values numerical values when the heating process (400) and (500) were carried out were indicated as well.

TABLE 1

| | Fe—Al alloy (Al 10 wt %) | | Fe—Al alloy (Al 13 wt %) | | Fe—Al alloy (Al 15 wt %) | |
|---|---|---|---|---|---|---|
| | Sens. (V) | Hys (%) | Sens. (V) | Hys (%) | Sens. (V) | Hys (%) |
| Ar | 1.963 | 0.80 | 1.573 | 0.16 | 1.340 | 0.53 |
| Vacuum | 1.157 | 0.87 | 0.830 | 0.36 | 0.891 | 0.66 |
| Air | — | — | 0.232 | 3.2 | — | — |

Consequently, as shown in the above-listed Table 1, the hysterisis of the manufactured magnetostrictive shaft can be reduced and the torque detection sensitivity of the sensor manufactured in the series of processes of the second embodiment can be higher.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A process for making a magnetostrictive shaft of a magnetostriction-type torque sensor, comprising the steps of:

(a) providing a magnetostrictive shaft to be interposed between intermediate ends of a rotatable shaft and having an outer peripheral surface made of a magnetostriction material and having a mother shaft made of a non-magnetic austenitic-series metallic material;

(b) mechanical working a shaft material of the magnetostrictive shaft;

(c) heating said mechanically worked shaft material under an inert gas atmosphere and holding said mechanically worked shaft material at a heated temperature; and (d) immersing the heated shaft material into an oil filled bath under the inert gas atmosphere so as to increase a cooling velocity of the heated shaft material.

2. A process for making a magnetostrictive shaft of a magnetostriction-type torque sensor as claimed in claim 1, wherein, in said heating process of step (c), the mechanically worked shaft material is heated under the inert gas atmosphere at a temperature ranging from 800° to 900° C. for approximately one hour.

3. A process for making a magnetostrictive shaft of a magnetostriction-type torque sensor as claimed in claim 2, wherein the inert gas is selected from at least one of Argon gas, Helium gas, or Neon gas.

4. A process for making a magnetostrictive shaft of a magnetostriction-type torque sensor as claimed in claim 2, wherein the temperature is approximately 850° C.

5. A process for making a magnetostrictive shaft of a magnetostriction-type torque sensor as claimed in claim 4, wherein said immersing process of the step (d) is carried out in an air-sealed chamber.

* * * * *